United States Patent
Kitamura et al.

(10) Patent No.: US 7,902,265 B2
(45) Date of Patent: Mar. 8, 2011

(54) RUBBER COMPOSITION FOR TIRE

(75) Inventors: Takamasa Kitamura, Hiratsuka (JP); Makio Mori, Hiratsuka (JP); Naoki Kushida, Hiratsuka (JP); Toshiaki Masuda, Yao (JP); Kenichi Kitano, Yao (JP); Yoshiaki Shirakabe, Yao (JP)

(73) Assignees: The Yokohama Rubber Co., Ltd., Tokyo (JP); Matsumoto Yushi-Seiyaku Co., Ltd, Osaka (JP)

( * ) Notice: Subject to any disclaimer, the term of this patent is extended or adjusted under 35 U.S.C. 154(b) by 327 days.

(21) Appl. No.: 12/253,311

(22) Filed: Oct. 17, 2008

(65) Prior Publication Data

US 2009/0105394 A1    Apr. 23, 2009

(30) Foreign Application Priority Data

Oct. 17, 2007 (JP) ................... 2007-270492
Nov. 12, 2007 (JP) ................... 2007-293501
Sep. 22, 2008 (JP) ................... 2008-242762

(51) Int. Cl.
*C08K 9/10* (2006.01)
*C08J 9/16* (2006.01)
*B60C 1/00* (2006.01)

(52) U.S. Cl. ............... 521/56; 523/205; 524/571
(58) Field of Classification Search .......... 521/56; 523/205; 524/571

See application file for complete search history.

(56) References Cited

U.S. PATENT DOCUMENTS

| 6,106,946 A | 8/2000 | Tanaka et al. |
| 2005/0026067 A1 | 2/2005 | Masuda et al. |
| 2006/0148979 A1 | 7/2006 | Mori et al. |

FOREIGN PATENT DOCUMENTS

| JP | 04246440 A | * | 9/1992 |
| JP | 10316801 | | 12/1998 |
| JP | 11035736 | | 2/1999 |
| JP | 2001279020 | | 10/2001 |
| JP | 2003105138 | | 4/2003 |
| JP | 2003327745 | | 11/2003 |

* cited by examiner

*Primary Examiner* — Vickey Nerangis
(74) *Attorney, Agent, or Firm* — Connolly Bove Lodge & Hutz LLP

(57) ABSTRACT

A rubber composition for a tire containing (i) 100 parts by weight of a diene-based rubber and (ii) 0.5 to 25 parts by weight of a heat-expandable microcapsule including a shell, and a substance capable of vaporizing or expanding under heating to thereby generate a gas and a nonpolar oil, both encapsulated in the shell, wherein the shell is made of a thermoplastic resin obtained by polymerization of a nitrile-based monomer (I), a monomer (II) having an unsaturated double bond and a carboxyl group in the molecule thereof, an optional monomer (III) having two or more polymerizable double bonds, and an optional copolymerizable monomer (IV) for adjusting the expansion properties.

4 Claims, No Drawings

RUBBER COMPOSITION FOR TIRE

TECHNICAL FIELD

The present invention relates to a rubber composition for a tire, more particularly relates to a rubber composition for a tire having an improved friction (or tractions) on ice, for example, a rubber composition for a tire tread capable of suppressing the decrease of the performance such as the increase in the hardness due to aging.

BACKGROUND ART

As a technology for increasing a friction on ice (i.e., ice traction) of rubber sought in tread rubber of studless tires, the technique of compounding heat-expandable microcapsules or heat-expandable graphite into a diene-based rubber has already been devised (see Japanese Patent Publication (A) No. 10-316801, Japanese Patent Publication (A) No. 11-035736 and Japanese Patent Publication (A) No. 13-279020). However, there is a problem in that further improvement of ice traction of rubber has been demanded and the increase in the hardness of tread rubber due to aging causes, for example, a decrease in the performance in the second year or thereafter.

In this regard, Japanese Patent Publication (A) No. 2003-327745 discloses a rubber composition comprising a rubber matrix, into which capsule particles enclosing a water repellent substance (e.g., silicone oil etc.) are compounded. However, the capsules do not thermally expand, and, therefore, the improvement in the ice traction is not sufficient. Further, Japanese Patent Publication (A) No. 2003-105138 describes production of a rubber composition containing heat-expandable microcapsules during which coating the surface of the heat-expandable microcapsules in advance with an oily substance, however, the problem of the decrease in performance causes by the increase in hardness due to aging of the tread rubber remain unsolved.

DISCLOSURE OF THE INVENTION

Accordingly, an object of the present invention is to suppress the increase in the hardness, with the elapse of a time, of a rubber composition for a tire containing a diene-based rubber and a heat-expandable microcapsule.

In accordance with the present invention, there is provided a rubber composition for tire comprising (i) 100 parts by weight of a diene-based rubber and (ii) 0.5 to 25 parts by weight of a heat-expandable microcapsule including a shell, and a substance capable of vaporizing or expanding under heating to thereby generate a gas and a nonpolar oil, both encapsulated in the shell, wherein a shell is made of a thermoplastic resin obtained by polymerization from a monomer mixture containing at least 40% by weight of a nitrile-based monomer.

According to the present invention, by encapsulating a nonpolar oil in the heat-expandable microcapsule to be compounded into a diene-based rubber, a water film generated by friction between a tire and an icy road surface is eliminated, the traction of the rubber on the ice is effectively improved, and the oil encapsulated in the microcapsule gradually migrates into the rubber with the elapse of time and can suppress the increase in the hardness.

BEST MODE FOR CARRYING OUT THE INVENTION

The inventors engaged in research for solving the above problems and, as a result, succeeded in obtaining a rubber composition containing a diene-based rubber, into which a heat-expandable microcapsule having a nonpolar oil encapsulated therein, is compounded, whereby the oil migrates from the shell of the capsule with the elapse of time and suppresses the increase in the hardness with the elapse of time.

According to the present invention, the above object can be achieved by a rubber composition for tire comprising 100 parts by weight of a diene-based rubber, into which 0.5 to 25 parts by weight, preferably 1 to 15 parts by weight, of the heat-expandable microcapsule including a shell, and a substance capable of vaporizing or expanding under heating to thereby generate a gas and a nonpolar oil, is compounded, wherein the shell is made of a thermoplastic resin obtained by the polymerization from a monomer mixture containing at least 40% by weight of a nitrile-based monomer.

In the rubber composition of the present invention, if the compounded amount of the heat-expandable microcapsule encapsulating a nonpolar oil is too small, the ice traction and the increase in the hardness with the elapse of time are not improved and, therefore, this is not preferred, while conversely if too large, the ice traction and the increase in the hardness with the elapse of time are improved, but the abrasion resistance is liable to be decreased.

As the nonpolar oil in the heat-expandable microcapsule compounded into the rubber composition of the present invention, any known naphthenic oil, paraffinic oil and aromatic oil commercially available for compounding into rubber may be used. These may be used alone or in any mixtures thereof. Note that, if the oil is not nonpolar, it will be incompatible with the rubber and the effect of suppression of the increase in the hardness cannot be obtained and, therefore, this is not preferred. The weight percentage of the nonpolar oil in the total weight of the substance capable of vaporizing or expanding under heating to thereby generate a gas and the nonpolar oil in the heat-expandable microcapsule is preferably 1 to 20% by weight, more preferably 1.2 to 10% by weight. There is a suitable value between the amount of oil and the expansion rate. If the amount of oil is too small, there is no effect, while if conversely too large, the expansion becomes difficult and the sufficient ice traction is liable to no longer be obtained.

The diene-based rubber compounded into the rubber composition of the present invention may be any diene-based rubber usable, as a rubber composition for a tire, specifically, for example, natural rubber (NR), polyisoprene rubber (IR), polybutadiene rubber (BR), styrene-butadiene copolymer rubber (SBR), acrylonitrile-butadiene copolymer rubber, etc. These may be used alone or in any blends thereof.

The heat-expandable microcapsules compounded into the rubber composition of the present invention include a shell made of thermoplastic resin, in which a substance capable of vaporizing or expanding under heating to thereby generate a gas and a nonpolar oil are encapsulated.

The shell of the heat-expandable microcapsules usable in the present invention can be obtained by copolymerization of a monomer mixture including, as the main components thereof, a nitrile-based monomer (I), a monomer (II) having an unsaturated double bond and carboxyl group in the molecule thereof, and an optional monomer (III) having two or more polymerizable double bonds, and an optional monomer (IV) copolymerizable with the above monomers for adjusting the expansion properties. The thermoplastic resin includes 40% by weight or more, preferably 40 to 90% by weight, more preferably 50 to 85% by weight, even more preferably 55 to 70% by weight, of the nitrile based monomer (I). If the amount of the monomer (I) is too small, the intended objects are liable to be difficult to achieve.

The shell of the heat-expandable microcapsules usable in the present invention can be obtained by polymerization in an ordinary method from the above monomer (I), the monomer (II) having an unsaturated double bond and a carboxyl group in the molecule thereof in an amount of preferably 7 to 50% by weight, more preferably 10 to 45% by weight, most preferably 15 to 40% by weight, the optional monomer (III) having two or more polymerizable double bonds in an amount of preferably 0 to 5% by weight, more preferably 0.05 to 5% by weight, most preferably 0.2 to 3% by weight; and the copolymerizable monomer (IV) for adjusting the expansion properties in an amount of preferably 0 to 20% by weight, more preferably 0 to 15% by weight, most preferably 1 to 10% by weight.

The heat-expandable microcapsules have, in the state not compounded into the rubber, a volume retention rate of the expanded bodies, after applying 15 MPa pressure to the expanded bodies after heat expansion, of preferably no less than 50%, more preferably 70 to 100%.

As the nitrile-based monomer (I) usable in the present invention, acrylonitrile, methacrylonitrile, α-chloroacrylonitrile, α-ethoxyacrylonitrile, fumaronitrile or any mixture thereof, etc. may be mentioned, but acrylonitrile and/or methacrylonitrile is particularly preferable.

Examples of the monomer (II) having an unsaturated double bond and carboxyl group in the molecule thereof, optionally usable in the present invention, are described below, but the monomer (II) is not limited to these examples. That is, for example, acrylic acid (AA), methacrylic acid (MAA), itaconic acid, styrene sulfonic acid or its sodium salt, maleic acid, fumaric acid, citraconic acid and mixtures thereof are included. If the amount is too large, the object of the present invention becomes difficult to be achieved. If too small on the other hand, the expandability at a high temperature region is liable to be decreased.

Examples of the monomer (III) having two or more polymerizable double bonds, optionally usable in the present invention, are described below, but the monomer (III) is not limited to these examples. That is, for example, divinylbenzene, divinylnaphthalene, and other aromatic divinyl compounds, allyl methacrylate, triacryl formal, triallyl isocyanate, ethyleneglycol di(meth)acrylate, diethyleneglycol di(meth)acrylate, triethyleneglycol di(meth)acrylate, 1,4-butanediol di(meth)acrylate, 1,9-nonanediol di(meth)acrylate, 1,10-decanediol di(meth)acrylate, PEG#200 di(meth)acrylate, PEG#400 di(meth)acrylate, PEG#600 di(meth)acrylate, neopentylglycol di(meth)acrylate, 1,6-hexanediol di(meth)acrylate, trimethylolpropane tri(meth)acrylate, EO-modified trimethylolpropane tri(meth)acrylate, glycerin di(meth)acrylate, dimethylol tricyclodecane di(meth)acrylate, pentaerythritol tri(meth)acrylate, pentaerythritol tetra(meth)acrylate, dipentaerythritol hexa(meth)acrylate, neopentylglycol acrylate benzoate ester, trimethylolpropane acrylate benzoate ester, 2-hydroxy-3-acryloyloxypropyl(meth)acrylate, hydroxypivarate neopentylglycol di(meth)acrylate, ditrimethyloylpropane tetra(meth)acrylate, 2-butyl-2-ethyl-1,3-propanediol di(meth)acrylate, polytetramethyleneglycol di(meth)acrylate, phenylglycidylether acrylate hexamethylene diisocyanate urethane prepolymer, phenylglycidylether acrylate toluene diisocyanate urethane prepolymer, pentaerythritol triacrylate hexamethylene diisocyanate urethane prepolymer, pentaerythritol triacrylate toluene diisocyanate urethane prepolymer, pentaerythritol triacrylate isophoron diisocyanate urethane prepolymer, etc. and any mixtures thereof are included.

Examples of the copolymerizable monomer (IV) for adjusting the expansion properties, optionally usable in the present invention, are described below, but the monomer (IV) is not limited to these examples. That is, for example, vinylidene chloride, vinyl acetate, methyl(meth)acrylate, ethyl(meth)acrylate, n-butyl(meth)acrylate, isobutyl(meth)acrylate, t-butyl(meth)acrylate, isobornyl(meth)acrylate, cyclohexyl(meth)acrylate, benzyl(meth)acrylate, β-carboxyethyl acrylate, and other (meth)acrylic acid esters, styrene, styrene sulfonic acid or the sodium salts thereof, α-methylstyrene, chlorostyrene, and other styrene-based monomer, acrylamide, substituted acrylamide, methacrylamide, substituted methacrylamide and other monomers in which a polymerization reaction proceeds by general radical initiators and any mixtures thereof are included. If the amount is too large, the object of the present invention is liable to become difficult to achieve.

The polymerization initiators usable for polymerization of the monomer mixture are, for example, described below, but the initiator is not limited to these examples. Preferably, the peroxide compounds of dialkyl peroxide, diacyl peroxide, peroxy acid esters, peroxydicarbonate, and azo compounds having half lives at the reaction temperature of preferably 1 to 25 hours, more preferably 5 to 20 hours, are used for suspension polymerization of the monomer mixture.

The heat-expandable microcapsules usable in the present invention can be generally produced using conventional production methods of heat-expandable microcapsules. That is, as a dispersion stabilizer in an aqueous system, silica, magnesium hydroxide or other inorganic particles are used. In addition, as a dispersion stabilization aid, a condensate of diethanolamine and an aliphatic dicarboxylic acid, polyvinylpyrrolidone, methyl cellulol, polyethylene oxide, polyvinyl alcohol, various emulsifiers, etc. may be used.

Examples of the substance capable of vaporizing or expanding under heating to thereby generate a gas are liquids such as n-butane, isobutane, n-pentane, isopentane, neopentane, n-hexane, isohexane, n-heptane, n-octane, isooctane, n-decane, isodecane, petroleum ether or other hydrocarbons, methyl chloride, methylene chloride, dichloroethylene, trichloroethane, trichloroethylene or other chlorinated hydrocarbons or solids such as azodicarbonamide, dinitrosopentamethylene tetramine, azobisisobutyronitrile, a toluenesulfonyl hydrazide derivative or an aromatic succinyl hydrazide derivative.

The heat-expandable microcapsules usable in the present invention are obtained by, for example, dispersing and suspension polymerizing a substance capable of vaporizing or expanding under heating to thereby generate a gas, a nonpolar oil, a monomer (I) (and if necessary, a monomer (II) to monomer (IV) as well), and a polymerization initiator in a water-based dispersion medium.

It is preferable that the heat-expandable microcapsules usable in the present invention do not substantially contain any ferromagnetic material. If the heat-expandable microcapsules contain a ferromagnetic material, they then have ferromagnetic properties and if the heat-expandable microcapsules are damaged in the mixing, extrusion, and forming processes, there may be contamination of the equipment by the ferromagnetic material. Note that, the "heat-expandable microcapsules not substantially containing any ferromagnetic material" means that the weight ratio of the ferromagnetic material to the total of the substance capable of vaporizing or expanding under heating to thereby generate a gas and the nonpolar oil is not more than 5% by weight, preferably not more than 3% by weight, more preferably not more than 1% by weight, still more preferably not more than 0.1% by weight, most preferably 0% by weight.

The heat-expandable microcapsules of the present invention do not expand in the mixing, extrusion, and forming processes and are expanded by the heat of vulcanization at a temperature of preferably 140 to 180° C., more preferably 150 to 170° C.

In the rubber composition of the present invention, in addition to the aforementioned components, carbon black, silica or other reinforcing agents (or fillers), vulcanization or cross-linking agents, vulcanization or cross-linking accelerators, various types of oils, antioxidants, plasticizers and other various additives that are generally used for tires and other rubber compositions may be compounded. These additives are mixed by general methods to obtain compositions which may be used for vulcanization or cross-linking. The amounts compounded of these additives may also be made the conventional general amounts, unless the objects of the present invention are not adversely affected.

EXAMPLES

Examples will now be used to further explain the present invention, but the scope of the present invention is by no means limited to these Examples.

Examples 1 to 8 and Comparative Example 1

Preparation of Samples

In each of the formulation shown in Table I or II, the ingredients other than the vulcanization accelerator, sulfur and heat-expandable microcapsules were mixed in a 1.7 liter Banbury mixer for 5 minutes and discharged, when reaching 145° C., to thereby obtain a master batch. This master batch was mixed with the vulcanization accelerator, sulfur and heat-expandable microcapsules at 70° C. by an open roll to obtain a rubber composition.

Then, the resultant rubber composition was press vulcanized in a 15×15×0.2 cm mold at 170° C. for 10 minutes to prepare a rubber sheet, which was then determined for the physical properties of the vulcanized rubber using the test methods shown below. The results are shown in Table I, indexed to the values of Comparative Example 1 as 100.

Test Methods for Evaluation of Rubber Physical Properties

Measurement of Ice Traction

A sheet-shaped rubber piece obtained by vulcanization of each compound was attached to a base rubber having a flattened columnar shape and the ice traction coefficient was measured using the inside drum type ice traction tester under the conditions of −1.5° C. measurement temperature, a 5.5 kg/cm load and a 25 km/h drum speed. The results are shown, indexed to the value of Comparative Example 1 as 100. The larger the value, the more superior the traction of the rubber on ice.

Rate of Increase in Hardness Due to Aging

Air oven aging was performed under the conditions of 80° C. and 168 hours, the hardnesses before and after the aging were measured based on JIS K 6253, and

[(post-aging hardness−pre-aging hardness)/pre-aging hardness]×100 was calculated. The results are shown, as indexed to the value of Comparative Example 1 as 100. The smaller the value, the smaller and better the rate of increase in the hardness due to aging.

Abrasion resistance: Based on JIS K6264, a Lambourn abrasion tester (made by Iwamoto Seisakusho) was used to determine the resistance under the conditions of a load of 6 kg (=49N), slip ratio of 25%, a time of 4 minutes, and room temperature. The abrasion loss is indicated, as an index. The results are shown, as indexed to the value of Comparative Example 1 as 100. The larger the value, the more superior the abrasion resistance.

TABLE I

|  | Comp. Ex. 1 | Ex. 1 | Ex. 2 | Ex. 3 | Ex. 4 |
|---|---|---|---|---|---|
| Formulation (parts by weight) | | | | | |
| NR*1 | 50 | 50 | 50 | 50 | 50 |
| BR*2 | 50 | 50 | 50 | 50 | 50 |
| Carbon black*3 | 25 | 25 | 25 | 25 | 25 |
| Silica*4 | 20 | 20 | 20 | 20 | 20 |
| Si69*5 | 1.6 | 1.6 | 1.6 | 1.6 | 1.6 |
| Zinc oxide*6 | 4 | 4 | 4 | 4 | 4 |
| Stearic acid*7 | 2 | 2 | 2 | 2 | 2 |
| Antioxidant*8 | 2 | 2 | 2 | 2 | 2 |
| Aromatic oil*9 | 25 | 25 | 25 | 25 | 25 |
| Sulfur*10 | 1.5 | 1.5 | 1.5 | 1.5 | 1.5 |
| Vulcanization accelerator*11 | 1.5 | 1.5 | 1.5 | 1.5 | 1.5 |
| Heat-expandable microcapsules A (no encapsulated oil) | 5 | — | — | — | — |
| Heat-expandable microcapsules C (encapsulated oil 5%) | — | 0.5 | 5 | 15 | 25 |
| Evaluated physical properties | | | | | |
| Ice traction (−1.5° C.) | 100 | 102 | 109 | 114 | 118 |
| Rate of rise of hardness | 100 | 97 | 83 | 77 | 73 |
| Abrasion resistance | 100 | 103 | 98 | 97 | 95 |

TABLE II

|  | Comp. Ex. 1 | Ex. 5 | Ex. 2 | Ex. 6 | Ex. 7 | Ex. 8 |
|---|---|---|---|---|---|---|
| Formulation (parts by weight) | | | | | | |
| NR*1 | 50 | 50 | 50 | 50 | 50 | 50 |
| BR*2 | 50 | 50 | 50 | 50 | 50 | 50 |
| Carbon black*3 | 25 | 25 | 25 | 25 | 25 | 25 |
| Silica*4 | 20 | 20 | 20 | 20 | 20 | 20 |
| Si69*5 | 1.6 | 1.6 | 1.6 | 1.6 | 1.6 | 1.6 |
| Zinc oxide*6 | 4 | 4 | 4 | 4 | 4 | 4 |
| Stearic acid*7 | 2 | 2 | 2 | 2 | 2 | 2 |
| Antioxidant*8 | 2 | 2 | 2 | 2 | 2 | 2 |
| Aromatic oil*9 | 25 | 25 | 25 | 25 | 25 | 25 |
| Sulfur*10 | 1.5 | 1.5 | 1.5 | 1.5 | 1.5 | 1.5 |
| Vulcanization accelerator*11 | 1.5 | 1.5 | 1.5 | 1.5 | 1.5 | 1.5 |
| Heat-expandable microcapsules A (no encapsulated oil) | 5 | — | — | — | — | — |
| Heat-expandable microcapsules B (encapsulated oil 1%) | — | 5 | — | — | — | — |
| Heat-expandable microcapsules C (encapsulated oil 5%) | — | — | 5 | — | — | — |
| Heat-expandable microcapsules D (encapsulated oil 15%) | — | — | — | 5 | — | — |
| Heat-expandable microcapsules E (encapsulated oil 20%) | — | — | — | — | 5 | — |
| Heat-expandable microcapsules F (encapsulated naphthenic oil 5%) | — | — | — | — | — | 5 |
| Evaluated physical properties | | | | | | |

TABLE II-continued

| | Comp. Ex. 1 | Ex. 5 | Ex. 2 | Ex. 6 | Ex. 7 | Ex. 8 |
|---|---|---|---|---|---|---|
| Ice traction (−1.5° C.) | 100 | 101 | 109 | 107 | 102 | 110 |
| Rate of rise of hardness | 100 | 98 | 83 | 82 | 85 | 85 |
| Abrasion resistance | 100 | 101 | 98 | 99 | 101 | 97 |

Footnotes of Table I and II
NR: Natural rubber RSS#3
BR: Polybutadiene rubber Nipol BR1220 made by Nippon Zeon
Carbon black: Carbon black Seast 6 made by Tokai Carbon
Silica: Nipsil AQ made by Japan Silica
Si69: SI69 made by Degussa
Zinc oxide: Zinc Oxide Type 3 made by Seido Chemical Industry
Stearic acid: Beads Stearic Acid made by NOF Corporation
Antioxidant: 6PPD made by Flexsys
Aromatic oil: Aromatic oil made by Fuji Kosan
Sulfur: Gold Flower brand oil-treated sulfur powder made by Tsurumi Chemical
Vulcanization accelerator: Nocceler CZ-G made by Ouchi Shinko Chemical Industrial
Heat-expandable microcapsules A: FLOOD made by Matsumoto Yushi-Seiyaku Co., Ltd.
Heat-expandable microcapsules (oil encapsulated) B to F: Manufactured by the methods below and then used.

Heat-Expandable Microcapsules B

As the aqueous ingredients, 40% solid content colloidal silica 45 g, diethanol amine-adipic acid polycondensate 1 g, sodium chloride 150 g, and ion-exchanged water 500 g were mixed, then adjusted to a pH of 3.5 to produce a water-based dispersion medium. Next, as the oil-based ingredients, acrylonitrile 70 g, methacrylonitrile 70 g, methacrylic acid 70 g, ethyleneglycol dimethacrylate 3 g and azobis(2,4-dimethylvaleronitrile) 1 g were mixed to prepare a uniform solution of a monomer mixture. To this monomer mixture, isopentane 20 g, 2-methylpentane 30 g, and aromatic oil 0.5 g were added. The resultant mixture was charged into an autoclave, then the water-based dispersion medium was further charged. The resultant mixture was stirred for 5 minutes at 700 rpm, then the autoclave interior was substituted with nitrogen and the reaction was performed at a reaction temperature of 60° C. for 8 hours. Note that the reaction pressure was 0.5 MPa and the stirring was performed at 350 rpm. The heat-expandable microcapsules obtained by this reaction were analyzed for their heat expansion properties. That is, a Perkin-Elmer Model TMA-7 was used for analysis of the expansion properties by the method described in Japanese Patent Publication (A) No. 11-002616, whereupon it was found that the resultant heat-expandable microcapsules had an expansion initiating temperature of 160° C. and a maximum expansion temperature of 210° C.

Heat-Expandable Microcapsules C

Other than changing the amount of aromatic oil to 2.6 g, the reaction was carried out by the same procedure as the heat-expandable capsules B. The resultant heat-expandable microcapsules had an expansion initiating temperature of 159° C. and a maximum expansion temperature of 210° C.

Heat-Expandable Microcapsules D

Other than changing the amount of aromatic oil to 8.8 g, the reaction was performed by the same procedure as the heat-expandable capsules B. The resultant heat-expandable microcapsules had an expansion initiating temperature of 162° C. and a maximum expansion temperature of 209° C.

Heat-Expandable Microcapsules E

Other than changing the amount of aromatic oil to 12.5 g, the reaction was carried out in the same procedure as the heat-expandable capsules B. The resultant heat-expandable microcapsules had an expansion initiating temperature of 160° C. and a maximum expansion temperature of 210° C.

Heat-Expandable Microcapsules F

Other than changing the aromatic oil of the heat-expandable microcapsules to naphthenic oil (KOMOLEX #2 made by Nippon Oil Corp.), the reaction was performed by the same procedure as the heat-expandable capsules C. The resultant heat-expandable microcapsule had an expansion initiating temperature of 155° C. and a maximum expansion temperature of 215° C.

INDUSTRIAL APPLICABILITY

According to the present invention, by encapsulating the nonpolar oil in the heat-expandable microcapsules, the oil from the shell of the capsules migrates into the rubber with the elapse of time and enables the increase in the hardness due to the elapse of time, in addition to water absorption to be suppressed, making it suitable for use in the treads of pneumatic tires, particularly the tread rubber of studless tires.

The invention claimed is:

1. A rubber composition for a tire comprising (i) 100 parts by weight of a diene-based rubber and (ii) 0.5 to 25 parts by weight of a heat-expandable microcapsule including a shell, and a substance capable of vaporizing or expanding under heating to thereby generate a gas and a nonpolar oil that is at least one oil selected from the group consisting of naphthenic oils, paraffinic oils and aromatic oils, both encapsulated in the shell,
    wherein the shell is made of a thermoplastic resin obtained by polymerization of a monomer mixture comprising at least 40% by weight of a nitrile-based monomer.

2. A rubber composition for a tire as claimed in claim 1, wherein the weight percentage of the nonpolar oil to the total weight of the substance and the nonpolar oil is 1 to 20% by weight.

3. A rubber composition for a tire as claimed in claim 1, wherein the shell of the heat-expandable microcapsule comprises a thermoplastic resin obtained by the polymerization of a nitrile-based monomer (I), a monomer (II) having an unsaturated double bond and carboxyl group in the molecule thereof, an optional monomer (III) having two or more polymerizable double bonds and an optional copolymerizable monomer (IV) for adjusting the expansion properties of the heat-expandable microcapsule.

4. A rubber composition for a tire as claimed in claim 2, wherein the shell of the heat-expandable microcapsule comprises a thermoplastic resin obtained by the polymerization of a nitrile-based monomer (I), a monomer (II) having an unsaturated double bond and carboxyl group in the molecule thereof, an optional monomer (III) having two or more polymerizable double bonds and an optional copolymerizable monomer (IV) for adjusting the expansion properties of the heat-expandable microcapsule.

* * * * *